United States Patent
Leroy et al.

(10) Patent No.: US 9,739,281 B2
(45) Date of Patent: Aug. 22, 2017

(54) METHOD OF DETERMINING A PRESSURE UPSTREAM OF A COMPRESSOR FOR AN ENGINE EQUIPPED WITH DOUBLE SUPERCHARGING

(71) Applicant: IFP Energies nouvelles, Rueil-Mailmaison (FR)

(72) Inventors: Thomas Leroy, Saint Germain en Laye (FR); Jonathan Chauvin, Paris (FR); Alexandre Chasse, Paris (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 112 days.

(21) Appl. No.: 14/427,450

(22) PCT Filed: Aug. 12, 2013

(86) PCT No.: PCT/FR2013/051929
§ 371 (c)(1),
(2) Date: Mar. 11, 2015

(87) PCT Pub. No.: WO2014/041272
PCT Pub. Date: Mar. 20, 2014

(65) Prior Publication Data
US 2015/0240826 A1    Aug. 27, 2015

(30) Foreign Application Priority Data

Sep. 11, 2012   (FR) .................................. 12 02419

(51) Int. Cl.
*F02B 33/44*    (2006.01)
*F02M 25/07*    (2006.01)
(Continued)

(52) U.S. Cl.
CPC ........ *F04D 27/001* (2013.01); *F02B 29/0412* (2013.01); *F02B 29/0418* (2013.01);
(Continued)

(58) Field of Classification Search
CPC ........ F04D 27/001; F04D 17/00; F04D 25/06; F02B 29/0412; F02B 29/0418;
(Continued)

(56) References Cited

U.S. PATENT DOCUMENTS 6,688,104 B2 * 2/2004 Baeuerle ............ F02D 41/0007
                                                              60/608
6,938,420 B2 * 9/2005 Kawamura ............ F02B 37/04
                                                              60/608

(Continued)

FOREIGN PATENT DOCUMENTS

DE    3205721 A1 *  8/1983   ............. F02B 37/04
DE   19905112 A1 *  8/2000   ............. F02B 37/04
(Continued)

OTHER PUBLICATIONS

Canova, M., et al: "Design and Validation of a Control-Oriented Model of a Diesel Engine with Two-Stage Turbocharger," SAE International Fuels and Lubricants Meeting and Exposition, XX, XX, vol. 2, No. 2, Sep. 13, 2009, pp. 387-397, XP002670239.

(Continued)

*Primary Examiner* — Thai Ba Trieu
(74) *Attorney, Agent, or Firm* — Fitch, Even, Tabin & Flannery LLP

(57) ABSTRACT

The invention relates to a method for determining the pressure $P_{avcm}$ upstream of a mechanical compressor (3) equipped with a double supercharging circuit of a combustion engine. The pressure $P_{avcm}$ is determined by a dynamic model based on a law of conservation of flow rate in the volume upstream of the mechanical compressor. The model links the pressure $P_{avcm}$ upstream of the mechanical compressor (3) to a temperature $T_{avcm}$ upstream of the mechanical compressor (3), to a boost pressure $P_{sural}$ and boost (Continued)

temperature $T_{sural}$ on the intake side of the engine, and to an openness Bypass of the bypass valve (4).

16 Claims, 11 Drawing Sheets

(51) Int. Cl.

| | |
|---|---|
| *F04D 27/00* | (2006.01) |
| *F02B 37/04* | (2006.01) |
| *F02D 23/00* | (2006.01) |
| *F02D 41/00* | (2006.01) |
| *F02M 35/10* | (2006.01) |
| *F02B 29/04* | (2006.01) |
| *F02B 37/12* | (2006.01) |
| *F04D 17/00* | (2006.01) |
| *F04D 25/06* | (2006.01) |
| *F02M 26/08* | (2016.01) |
| *F02D 41/22* | (2006.01) |
| *F02B 37/24* | (2006.01) |
| *F02B 39/04* | (2006.01) |
| *F02B 39/16* | (2006.01) |

(52) U.S. Cl.
CPC ............ *F02B 37/04* (2013.01); *F02B 37/127* (2013.01); *F02D 23/005* (2013.01); *F02D 41/0007* (2013.01); *F02M 26/08* (2016.02); *F02M 35/1038* (2013.01); *F04D 17/00* (2013.01); *F04D 25/06* (2013.01); *F04D 27/009* (2013.01); *F02B 37/24* (2013.01); *F02B 39/04* (2013.01); *F02B 39/16* (2013.01); *F02D 41/221* (2013.01); *F02D 2200/0402* (2013.01); *F02D 2200/0406* (2013.01); *F02D 2200/0408* (2013.01); *F02D 2200/0414* (2013.01); *Y02T 10/144* (2013.01); *Y02T 10/146* (2013.01)

(58) Field of Classification Search
CPC ........ F02B 37/00; F02B 37/04; F02B 37/127; F02B 37/24; F02B 39/04; F02B 39/16; F02D 23/005; F02D 41/0007; F02D 41/221; F02D 2200/0402; F02D 220/0406; F02D 220/0408; F02D 2200/0414; F02M 25/0711; F02M 25/0709; F02M 35/1038; Y02T 10/144; Y02T 10/146
USPC ............ 60/605.1, 611, 612, 605.2, 608–609; 701/102–104, 108
See application file for complete search history.

(56) References Cited

U.S. PATENT DOCUMENTS

| | | | | |
|---|---|---|---|---|
| 7,540,148 B2* | 6/2009 | Wild | ........................ | F02B 37/04 60/608 |
| 7,788,923 B2* | 9/2010 | Rowells | ............. | F02M 25/0711 60/605.2 |
| 8,109,092 B2* | 2/2012 | Pursifull | ................. | F02B 37/04 60/607 |
| 8,209,981 B2* | 7/2012 | Pursifull | ................. | F02B 37/04 60/607 |
| 8,794,000 B2* | 8/2014 | Baldwin | ................. | F02B 39/04 60/612 |
| 9,010,114 B2* | 4/2015 | Krug | ....................... | F02B 37/04 60/611 |
| 9,140,199 B2* | 9/2015 | Mond | ..................... | F02B 37/04 60/611 |
| 2008/0148828 A1 | 6/2008 | Miles et al. | | |
| 2009/0007563 A1* | 1/2009 | Cooper | ................... | F02B 37/04 60/612 |
| 2010/0152992 A1 | 6/2010 | Burkhardt et al. | | |
| 2010/0263375 A1* | 10/2010 | Grieve | .................... | F02B 37/04 60/612 |
| 2012/0090319 A1* | 4/2012 | Mond | ..................... | F02B 37/04 60/609 |
| 2013/0125544 A1* | 5/2013 | Mond | ..................... | F02B 37/04 60/611 |
| 2013/0282256 A1* | 10/2013 | Watanuki | ................ | F02D 23/02 701/102 |
| 2015/0247447 A1* | 9/2015 | Leroy | .................... | F02B 37/04 60/611 |
| 2015/0315960 A1* | 11/2015 | Thomas | .................. | F02B 37/04 60/611 |
| 2015/0345373 A1* | 12/2015 | Knight | ................... | F02B 37/04 60/611 |

FOREIGN PATENT DOCUMENTS

| | | | | |
|---|---|---|---|---|
| DE | 19928523 A1 * | 1/2001 | ............. | F02B 37/04 |
| DE | 10241885 A1 * | 3/2004 | ............. | F02B 37/04 |
| DE | 102004036064 A1 | 3/2006 | | |
| DE | 102006062213 A1 | 6/2008 | | |
| DE | 102007022703 B3 | 11/2008 | | |
| DE | 102010027220 * | 1/2012 | ............. | F02B 37/04 |
| EP | 1398470 A1 | 3/2004 | | |
| EP | 1475524 A1 | 11/2004 | | |
| FR | 2491996 A1 * | 4/1982 | ............. | F02B 37/04 |
| FR | 2917128 A1 * | 12/2008 | ........... | F02B 37/013 |
| FR | 2928692 A1 | 9/2009 | | |
| FR | 2949140 A1 | 2/2011 | | |
| JP | 2004076659 A * | 3/2004 | ............. | F02B 37/04 |
| JP | 2004108152 A * | 4/2004 | ............. | F02B 37/04 |
| JP | 2004169662 A * | 6/2004 | ............. | F02B 37/04 |
| JP | 2004225648 A * | 8/2004 | ............. | F02B 37/04 |
| JP | 2004232541 A * | 8/2004 | ............. | F02B 37/04 |
| JP | 2005061243 A * | 3/2005 | ............. | F02B 37/04 |
| WO | WO 2006066739 A1 * | 6/2006 | ............. | F02B 37/04 |
| WO | WO 2012029603 A1 * | 3/2012 | ............. | F02B 37/04 |

OTHER PUBLICATIONS

International Search Report for International Application No. PCT/FR2013/051929 dated Nov. 6, 2013.

\* cited by examiner

METHOD OF DETERMINING A PRESSURE UPSTREAM OF A COMPRESSOR FOR AN ENGINE EQUIPPED WITH DOUBLE SUPERCHARGING

CROSS REFERENCE TO RELATED APPLICATIONS

Reference is made to French Application Serial No. 12/02419, filed Sep. 11, 2012 and PCT/FR2013/051929, filed Aug. 12, 2013, which applications are incorporated herein by reference in their entirety.

BACKGROUND OF THE INVENTION

Field of the Invention

The present invention relates to the field of combustion engines, and more particularly to combustion engines equipped with double supercharging.

Description of the Prior Art

The supercharging of an engine increases the quantity of air and fuel mixture within the cylinders of the engine in comparison with normal operation. Supercharging, and especially double supercharging, make it possible to increase the efficiency of a combustion engine without changing the rotational speed. This is because engine torque (and therefore power) is dependent on the angle formed between the connecting rod and the crankshaft, on the pressure of the gases inside the cylinder, referred to as the Mean Effective Pressure (or MEP) and on the pressure of the amount of fuel introduced. For example, for a gasoline engine, if the amount of gasoline introduced into the cylinder is increased, then the mass of air (oxidizer) must also be increased proportionately in order to ensure complete combustion of this fuel (the same air/fuel ratio is maintained).

In order to obtain this supercharging, the mass of gas on the intake side is increased, making it possible to increase the quantity of fuel. In order to do that, the gaseous mixture on the intake side of the engine (essentially comprising air and optionally burnt gases) is compressed. This compression may be performed by the compressor of a turbocharger driven by the exhaust gases by means of a turbine, or compression may be performed by a separate mechanical compressor which may be driven by the engine crankshaft. Double supercharging is referred to when the gaseous mixture on the intake side is compressed twice: for example a first time by a compressor of the turbocharger and a second time by a mechanical compressor situated in the engine intake circuit. Conventionally, the mechanical compressor, which is dynamically controlled, compensates for the start-up inertia of the turbocharger.

In order to control the pressure of the air on the intake side, referred to as the boost pressure, it is possible to alter the way in which the two compressors behave. On the one hand, in order to control the air passing through the mechanical compressor, a valve is controlled, which is referred to as a bypass valve, which is positioned in parallel with the compressor and diverts air toward the compressor according to its openness, and which is controlled. Furthermore, when the compressor is driven by the engine crankshaft and is controlled by a clutch is inserted between a reduction gear and the mechanical compressor. The clutch allows the mechanical compressor to be activated or deactivated. Conventionally, the mechanical compressor is deactivated for high engine speeds (the limiting speed is dependent on the drive ratio between the crankshaft and the mechanical compressor). On the other hand, in order to control the compression of air by the turbocharger, the turbocharger is equipped with a variable geometry turbine (VGT), which when controlled changes the rotational speed of the turbocharger and therefore a change in the compression.

Thus equipped, the combustion engine and the supercharging system needs instrumentation to determine various pressures and temperatures within the supercharging circuit. The measured values are used for controlling the supercharging, the engine, and diagnosing of the operation of the supercharging.

FIG. 1 depicts a prior art combustion engine equipped with double supercharging and instrumentation. An engine (1) is equipped with an intake circuit and with an exhaust circuit. Arranged in the intake circuit in the direction in which the air flows are: an air filter (7), the compressor of the turbocharger (2), a first charge air cooler (6), a mechanical compressor (3) and a second charge air cooler (5). Arranged in parallel with the mechanical compressor is a diverting or bypass circuit comprising a bypass valve (4). In the exhaust circuit is a variable geometry turbine (VGT) identified as (2). The mechanical compressor (3) is driven by the crankshaft of the engine (1) via a transmission, which is a belt, and by a clutch (11). The charge air coolers (5 and 6) allow the air which becomes heated during the successive compressions to be cooled.

Furthermore, as depicted, the engine may comprise an exhaust gas recirculation (EGR) circuit (8) comprising a cooler (10) and a valve (9) which is referred to as an EGR valve. The circulating burnt gaseous mixture with the fresh air between the air filter (7) and the compressor of the turbocharger (2). The engine (1) as depicted comprises four cylinders. These last two characteristics (the EGR and the number of cylinders) are independent of the invention and are nonlimiting.

According to this prior art, the engine (1) is equipped with four sensors making it possible respectively to measure a pressure $P_{avcm}$ of a gaseous mixture upstream of a mechanical compressor (3), a temperature $T_{avcm}$ upstream of the mechanical compressor (3), and a boost pressure $P_{sural}$ and boost temperature $T_{sural}$ on the intake side of the engine (1). The use of four sensors is a restriction of the design of the engine notably in terms of bulk, mounting, location of the sensors, etc., and is expensive.

SUMMARY OF THE INVENTION

In order to avoid proliferating the number of sensors and to make designing the engine easier, the invention relates to a method of determining the pressure $P_{avcm}$ upstream of the (mechanical or electric) compressor. The pressure is determined by an estimator based on a law of conservation of flow rate in the volume upstream of the mechanical compressor. This conservation-of-flow rate law makes it possible to take into consideration the physical behavior of the flows and therefore obtain a reliable and robust estimate of the pressure $P_{avcm}$.

The invention relates to a method of determining a pressure $P_{avcm}$ of a gaseous mixture including fresh air and burnt gas upstream of a mechanical compressor incorporated into a supercharging system of a combustion engine, the supercharging system further comprising a turbocharger for compressing the gaseous mixture on the intake side of the engine and a bypass circuit arranged in parallel with the mechanical compressor comprising a bypass valve. For this method, the following steps are carried out:

a) a dynamic model is made by applying a conservation-of-flow rate law to the volume upstream of the mechanical compressor, the model linking the pressure $P_{avcm}$ upstream of the mechanical compressor to a temperature $T_{avcm}$ upstream of the mechanical compressor, to a boost pressure $P_{sural}$ and a boost temperature $T_{sural}$ on the intake side of the engine, and to an openness Bypass of the bypass valve;

b) the temperature $T_{avcm}$ upstream of the compressor compressor is determined;

c) the boost pressure $P_{sural}$ and the boost temperature $T_{sural}$ on the intake side of the engine and the openness Bypass of the bypass valve are acquired; and d) the pressure $P_{avcm}$ upstream of the mechanical compressor is determined by the dynamic model.

According to one embodiment of the invention, the temperature $T_{avcm}$ upstream of the mechanical compressor is determined by a temperature sensor positioned upstream of the compressor.

Alternatively, with the supercharging system further comprising a charge air cooler between the turbocharger and the mechanical compressor, the temperature $T_{avcm}$ upstream of the mechanical compressor is determined by a map of the air cooler and of a flow rate passing through the air cooler.

According to the invention, the dynamic model is written in the form of a formula of the type:

$$\dot{P}_{avcm} = \frac{RT_{avcm}}{V_{avcm}}(D_{bp} + D_c - D_{cm})$$

where $\dot{P}_{avcm}$ is the first derivative with respect to time of the pressure $P_{avcm}$ upstream of the mechanical compressor, R is the perfect gas constant, $V_{avcm}$ is the volume upstream of the mechanical compressor, $D_{bp}$ is the flow rate passing through the bypass valve, $D_c$ is the flow rate passing through the turbocharger, and $D_{cm}$ is the flow rate passing through the mechanical compressor. The flows $D_{bp}$ and $D_{cm}$ are dependent on the pressure $P_{avcm}$ upstream of the mechanical compressor, on the pressure $P_{sural}$ and on the boost temperature $T_{sural}$ on the intake side of the engine and on the degree of openness Bypass of the bypass valve sensor 14.

Advantageously, the flow rate $D_{bp}$ passing through the bypass valve is determined by a pressure drop relationship across the bypass valve, which can be written in the form of a formula of the type: $D_{bp} = A_{bp}(\text{Bypass}) \times f(P_{avcm}, P_{sural}, T_{avcm})$ where $A_{bp}(\text{Bypass})$ is the area of opening of the Bypass valve and f is the flow rate per unit area defined by a formula of the type:

$$f(P_{avcm}, P_{sural}, T_{avcm}) = \frac{P_{sural}}{\sqrt{RT_{avcm}}}$$

$$\begin{cases} \left(\frac{P_{avcm}}{P_{sural}}\right)^{\frac{1}{\gamma}} \sqrt{\frac{2}{\gamma-1}\left(1-\left(\frac{P_{avcm}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

where γ is the ratio of the mass heat capacities of the gases.

For preference, the mechanical compressor is driven by the crankshaft of the engine as shown in FIG. 15, the flow rate $D_{cm}$ passing through the mechanical compressor can be written in the form of a formula of the type:

$$D_{cm} = \phi\left(r_{cm} \times N_e, \frac{P_{sural} + \delta P\left(r_{cm} \times N_e, \frac{P_{avcm}}{RT_{avcm}}\right)}{P_{avcm}}\right)\rho_{cm}$$

where $r_{cm}$ is the reduction ratio between the mechanical compressor and the crankshaft, $\rho_{cm}$ is the density of the gases passing through the mechanical compressor as given by $$\rho_{cm} = \frac{P_{avcm}}{RT_{avcm}},$$

R is the perfect gas constant, φ is the volumetric flow rate of the mechanical compressor, and δP is the pressure drops across an air cooler situated between the turbocharger and the mechanical compressor.

Alternatively, the mechanical compressor is driven by an electric motor.

In addition, the determined pressure $P_{avcm}$ may be saturated by the atmospheric pressure $P_{atm}$ and the boost pressure $P_{sural}$, notably in the form of a formula of the type: $P_{avcm} = \min(\max(P_{atm}, P_{avcm}), P_{sural})$.

According to the invention, the boost pressure $P_{sural}$ and the boost temperature $T_{sural}$ on the intake side of the engine are acquired as shown in FIG. 16 by pressure and temperature sensors $P_{sural}$ and $T_{sural}$ positioned upstream of the intake manifold of the engine.

Furthermore, the invention relates to a method for controlling the supercharging of a combustion engine equipped with a supercharging system, the supercharging system comprising a turbocharger and a mechanical compressor for compressing the gaseous mixture including fresh air and burnt gas on the intake side of the engine and a bypass circuit arranged in parallel with the mechanical compressor comprising a bypass valve. For this method the following steps are carried out:

a) the pressure $P_{avcm}$ of a gaseous mixture upstream of a mechanical compressor is determined by the method as described hereinabove;

b) the supercharging conditions are determined by the pressure $P_{avcm}$; and c) the bypass valve and/or the turbocharger is or are controlled as a function of the supercharging conditions by the block labeled Engine CON in FIG. 16.

In addition, the invention relates to a method for diagnosing abnormal operation of a supercharging system of a combustion engine. The supercharging system comprises a turbocharger and a mechanical compressor for compressing the gaseous mixture on the intake side of the engine and a bypass circuit arranged in parallel with the mechanical compressor comprising a bypass valve. For this method, the following steps are carried out:

a) the pressure $P_{avcm}$ of a gaseous mixture upstream of a mechanical compressor is determined by the method as described hereinabove;

b) the supercharging conditions are determined by the pressure $P_{avcm}$; and c) the abnormal operation of the supercharging system is detected by the supercharging conditions.

Advantageously, the abnormal operation of the supercharging system is a leak in the intake system.

The invention also relates to a method of controlling a combustion engine equipped with a supercharging system. The supercharging system comprises a turbocharger and a mechanical compressor for compressing a gaseous mixture including fresh air and burnt gas on the intake side of the engine and a bypass circuit arranged in parallel with the mechanical compressor comprising a controlled bypass valve. For this method, the following steps are carried out:

a) a temperature $T_{avcm}$ upstream of the mechanical compressor, a boost pressure $P_{sural}$ and a boost temperature $T_{sural}$ on the intake side of the engine, and a pressure $P_{avcm}$ upstream of the mechanical compressor are determined as illustrated in FIG. 16 by the method as described hereinabove;

b) a boost pressure set point $P_{sural}^{sp}$ is acquired;

c) a filling model that models the filling of the supercharging volume comprised between the intake valves of the engine on the one hand, and the mechanical compressor and the bypass valve on the other is made, the model linking the boost pressure $P_{sural}$ to the openness Bypass of the bypass valve by the pressure $P_{avcm}$ and the temperature $T_{avcm}$ upstream of the mechanical compressor and the boost temperature $T_{sural}$ as illustrated by FIG. 15;

d) an openness setpoint $Bypass^{sp}$ for the bypass valve is determined by the filling model, of the boost pressure setpoint $P_{sural}^{sp}$, and of the pressure $P_{avcm}$ and the temperature $T_{avcm}$ upstream of the mechanical compressor and of the boost pressure $P_{sural}$ and the boost temperature $T_{sural}$; and e) the bypass valve is controlled according to the openness setpoint $Bypass^{sp}$ of the bypass valve.

Advantageously, the filling model is determined by a filling equation regarding the filling of the supercharging volume and defined by a conservation-of-flow rate formula of the type:

$$\dot{P}_{sural} = \frac{RT_{sural}}{V_{sural}}(D_{cm} - D_{bp} - D_{asp})$$

where $\dot{P}_{sural}$ is the first derivative of the boost pressure $P_{sural}$ with respect to time, R is the perfect gas constant, $V_{sural}$ is the supercharging volume, $D_{cm}$ is the flow rate arriving from the compressor, $D_{bp}$ is the flow rate leaving through the bypass valve which is a function of the openness of the bypass valve, and $D_{asp}$ is the aspirated flow rate leaving toward the cylinders of the engine.

According to an alternative form of the invention, the filling model is an open-loop filling model which can be written in the form of a relationship of the type:

$$Bypass^{sp} = A_{bp}^{-1}\left(\frac{1}{f(P_{avcm}, P_{sural}, T_{avcm})}\right.$$
$$\left.\left(-\frac{V_{sural}}{RT_{sural}}\dot{P}_{sural}^{sp} + \phi\left(r_{cm} \times Ne, \frac{P_{sural}^{sp} + \delta P(r_{cm} \times Ne, \rho_{cm})}{P_{avcm}}\right)\rho_{cm} - D_{asp}^{sp}\right)\right)$$

where $r_{cm}$ is the reduction ratio between the mechanical compressor and the crankshaft, $\rho_{cm}$ is the density of the gases passing through the mechanical compressor as given by $$\rho_{cm} = \frac{P_{acvm}}{RT_{acvm}}, \phi$$

is the volumetric flow rate of the mechanical compressor, $D_{asp}^{sp}$ is the flow rate setpoint for gas aspirated by the cylinders of the engine, $A_{bp}$(Bypass) is the area of opening of the bypass valve and f is the flow rate per unit area defined by a formula of the type:

$$f(P_{avcm}, P_{sural}, T_{avcm}) = \frac{P_{sural}}{\sqrt{RT_{avcm}}}$$

$$\begin{cases} \left(\frac{P_{avcm}}{P_{sural}}\right)^{\frac{1}{\gamma}}\sqrt{\frac{2}{\gamma-1}\left(1-\left(\frac{P_{avcm}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

where $\gamma$ is the ratio of the mass heat capacities of the gases, and $\delta P$ is the pressure drops across an air cooler situated between the turbocharger and the said mechanical compressor.

According to another alternative form of the invention, the filling model is a closed-loop filling model which can be written in the form of a relationship of the type:

$$Bypass^{sp} = A_{bp}^{-1}\left(\frac{1}{f(P_{avcm}, P_{sural}^{sp}, T_{avcm})}\left(-\frac{V_{sural}}{RT_{sural}}\dot{P}_{sural}^{sp} + \right.\right.$$
$$\left.\left.\delta_{p1} + \phi\left(r_{cm} \cdot N_e, \frac{P_{sural}^{sp} + \delta P(r_{cm} \cdot N_e \cdot \rho_{cm})}{P_{avcm}}\right)\rho_{cm} - D_{asp}^{sp}\right)\right)$$

where $\delta_{P1} = K_p(P_{sural} - P_{sural}^{sp}) - K_i\int_0^t(P_{sural} - P_{sural}^{sp})dt$, $r_{cm}$ is the reduction ratio between the mechanical compressor and the crankshaft, $\rho_{cm}$ is the density of the gases passing through the mechanical compressor and given by $$\rho_{cm} = \frac{P_{acvm}}{RT_{acvm}},$$

Ø is the volumetric flow rate of the mechanical compressor, $D_{asp}^{sp}$ is the flow rate setpoint for gas aspirated by the cylinders of the engine, $\delta P$ cap is the pressure drops across an air cooler situated between the turbocharger and the mechanical compressor, Ki and $K_p$ are calibration parameters for the feedback loop and $A_{bp}$(Bypass) is the area of opening of the bypass valve and f is the flow rate per unit area defined by a formula of the type:

$$f(P_{avcm}, P_{sural}, T_{avcm}) = \frac{P_{sural}}{\sqrt{RT_{avcm}}}$$

$$\begin{cases} \left(\frac{P_{avcm}}{P_{sural}}\right)^{\frac{1}{\gamma}}\sqrt{\frac{2}{\gamma-1}\left(1-\left(\frac{P_{avcm}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

where $\gamma$ is the ratio of the mass capacities of the gases.

BRIEF DESCRIPTION OF THE DRAWINGS

Other features and advantages of the method according to the invention will become apparent from reading the description hereinafter of some nonlimiting exemplary embodiments, with reference to the attached figures described hereinafter.

DETAILED DESCRIPTION OF THE INVENTION

Figure 1:
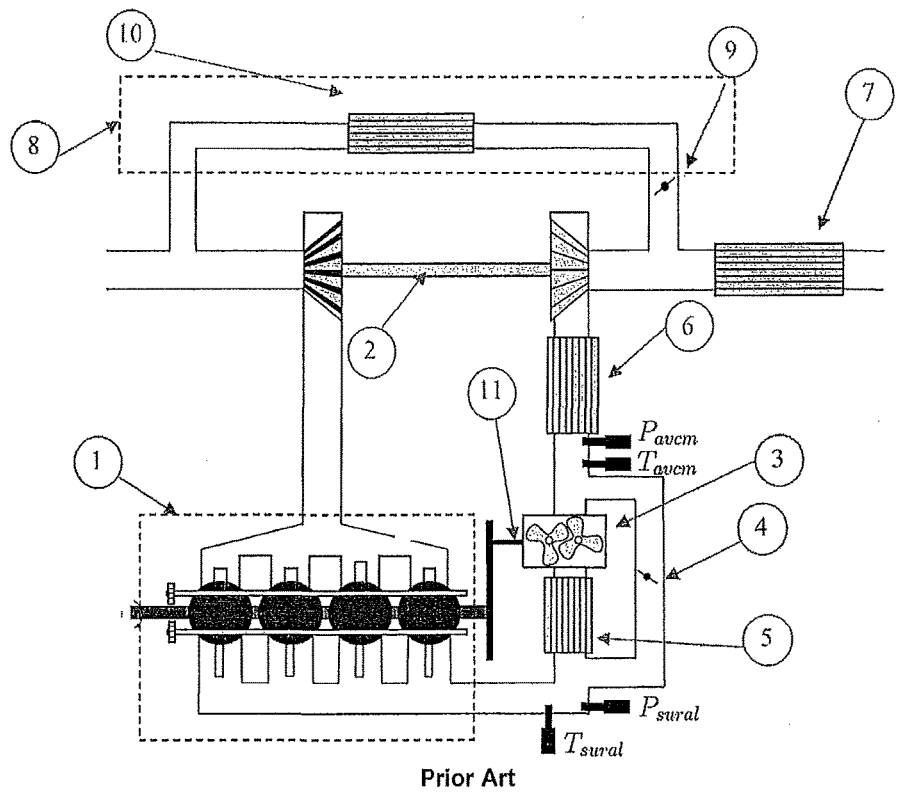
FIG. 1, already described, illustrates a prior art engine equipped with a double supercharging system and instrumented with four sensors.

The method of determining the pressure upstream of a mechanical or electric (i.e. driven by an electric motor) compressor according to the invention is suited to any combustion engine equipped with double supercharging and is not restricted to the combustion engine of FIG. 1. However, in order to explain the invention, the method is described for the case of the double-supercharging example of FIG. 1. In addition, in the remainder of the description and in FIGS. 2a) and 2b), only the embodiment with a mechanical compressor driven by the crankshaft of the combustion engine is described although the invention is equally suited to double supercharging performed by a mechanical compressor driven by an electric motor.

Figure 16:
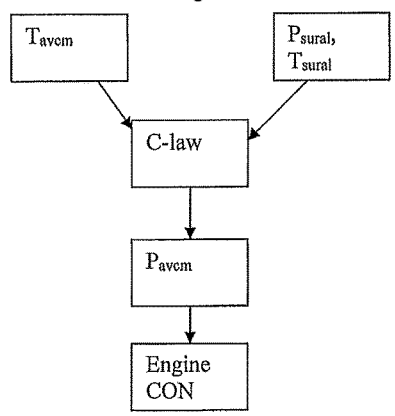
FIG. 16 is a flow chart of the method of the present invention.
Figure 18:
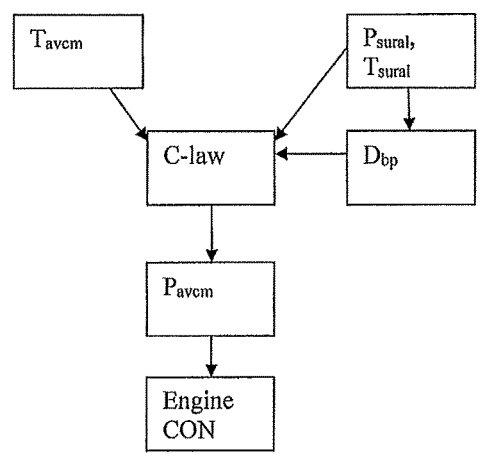
FIG. 18 corresponds to FIG. 16 with the addition of determination of air flow $D_{bp}$ passing through bypass valve 4 from a pressure drop relationship.

The method according to the invention is illustrated in FIGS. 16 and 18 and involves determining the upstream pressure $P_{avcm}$ of a gaseous mixture (air and optionally burnt gases) upstream of the compressor of a supercharging system. In order to determine this pressure, the following steps are performed with reference to FIGS. 16 and 18:
1) The temperature $T_{avcm}$ upstream of the compressor is determined.
2) The boost pressure and boost temperature and the openness of the bypass valve are acquired.
3) The upstream pressure $P_{avcm}$ is determined by means of a dynamic model.

Steps 1) and 2) are independent and can be carried out in the order described, in the reverse order, or simultaneously. Thus, by virtue of the method according to the invention, it is possible to know the pressure upstream of the compressor without the use of an additional sensor.

Notations

Figure 15:
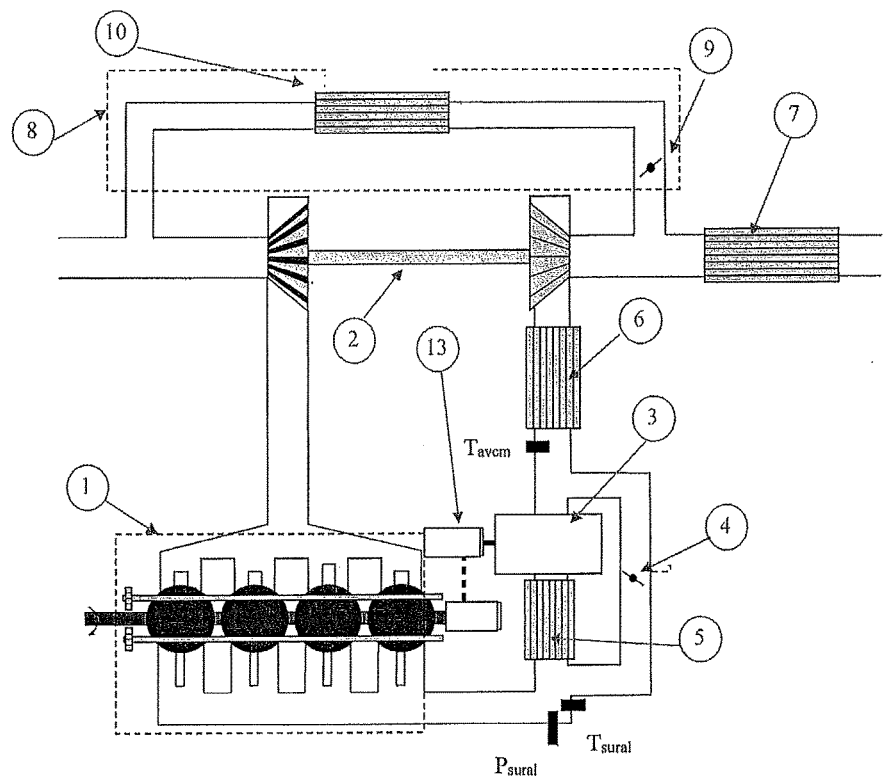
FIG. 15 illustrates a combustion engine in accordance with the invention equipped with double supercharging performed by a mechanical compressor driven by an electric motor 13.

During the course of the description with reference to FIG. 15, like reference numerals are used in FIG. 1 (Prior Art) in which FIG. 15 illustrates an engine for practicing the method of the invention. The terms upstream and downstream are defined with respect to the direction in which the gases flow on the intake side which is to the left in FIG. 15 and on the exhaust side which is to the right in FIG. 15 of the engine 1. In addition, the following notations are used:

$P_{avcm}$, $T_{avcm}$ are the pressure and temperature upstream of the mechanical compressor (3), on the outlet side of the first charge air cooler (6).

$P_{sural}, T_{sural}$ are the boost pressure and temperature on the intake side of the engine (1) and downstream of the mechanical compressor (3).

$V_{avcm}$ is the volume upstream of the mechanical compressor (3) comprised between the mechanical compressor (3) and the air cooler (6).

$V_{sural}$ is the supercharging boost volume comprised between the intake valves of the engine (1) on the one hand, and the mechanical compressor (3) and the bypass valve (4) on the other.

$P_{apcm}$ is the pressure downstream of the mechanical compressor (3) and upstream of the second charge air cooler (5).

$P_{atm}$ is the atmospheric pressure.

Bypass is the position of opening of the bypass valve (4).

$N_c$ is the speed of the engine (1).

R is the specific perfect gas constant which is the same for all the gases involved here (air and exhaust gases), and which is equal to 288 J/kg/K.

$D_{cm}$ is the mass flow rate of air leaving the mechanical compressor (3).

$D_{bp}$ is the mass flow rate of air passing through the bypass valve (4).

$D_c$ is the mass flow rate of air passing through the compressor of the turbocharger (2).

$A_{bp}$ is the area of opening of the bypass valve (4).

$\gamma$ is the ratio of the mass heat capacities of the gases; for the gaseous mixture (air and exhaust gas) it is considered that $\gamma=1.4$.

$r_{cm}$ is the reduction ratio between the mechanical compressor (3) and the crankshaft (when the compressor is a mechanical compressor and is driven by the engine).

$\rho_{cm}$ is the density of the gases passing through the mechanical compressor (3), given by $$\rho_{cm} = \frac{P_{acvm}}{RT_{acvm}}.$$

$\varphi$ is the volumetric flow rate of the mechanical compressor (3). The volumetric flow rate is obtained from a map which may form part of the data supplied by the supplier of the mechanical compressor (3).

$\delta P$ is the pressure drop across the charge air cooler (6) situated between the turbocharger (2) and the mechanical compressor (3). This pressure-drop term is mapped as a function of the speed of the mechanical compressor (3) and of the density of the gases.

$K_i$ and $K_p$ are the calibration parameters for the feedback loop for the closed-loop embodiment of the control method.

MEP is the mean effective pressure which corresponds to the ratio between the work supplied by the engine (1) during a cycle and the cylinder capacity of the engine (1).

VGT is the openness of the turbine of the turbocharger (2).

These notations, with the suffix $-^{sp}$, represent setpoints associated with the concerned parameters. The suffix $-^{mes}$ indicates measured values; the suffix $-^{nom}$ indicates nominal values; the suffix $-^{disp}$ corresponds to values with spread (dispersion); and the suffix $-^{est}$ indicates estimated values. The first derivative with respect to time is indicated by a dot above the variable concerned.

Step 1) Determining the Temperature Upstream of the Mechanical Compressor

With reference to FIG. 15, in order to determine the pressure $P_{avcm}$ upstream of the mechanical compressor (3), the temperature $T_{avcm}$ upstream of the mechanical compressor (3) is determined and is applied to dynamic model C-law function whose output is $P_{avcm}$ which is applied to the engine control function Engine CON.

Figures 2A, 2B:
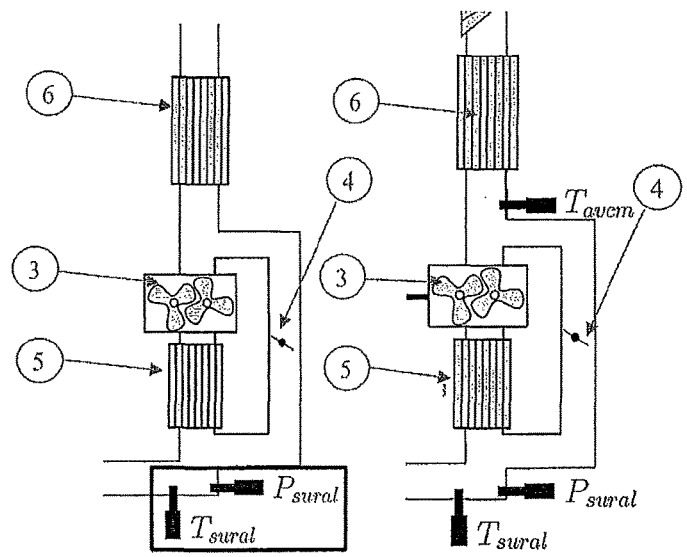
FIGS. 2a) and 2b) illustrate part of the supercharging circuit instrumented for two embodiments of the method according to the invention.
Figure 17:
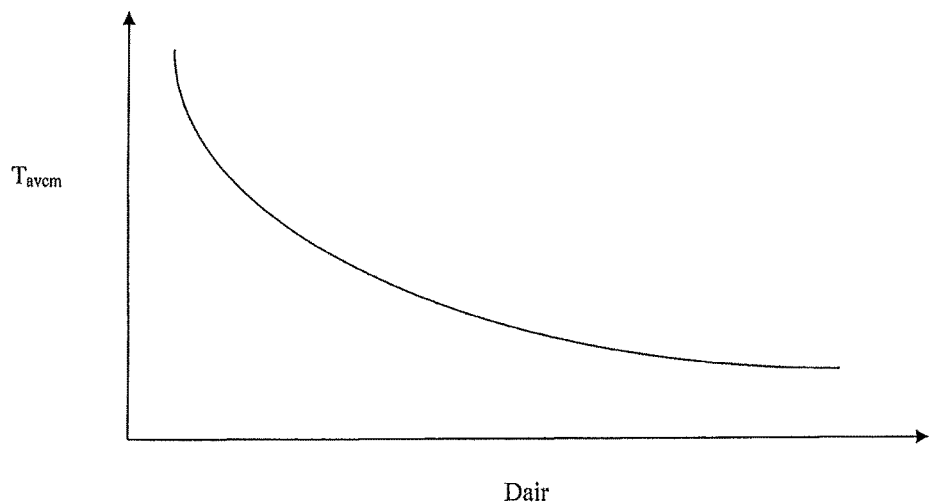
FIG. 17 illustrates a map of the air cooler 6 illustrating evolution of the temperature $T_{avcm}$ in relation to air flow $D_{air}$ passing through the air cooler.

According to a first alternative form of this step, the temperature $T_{avcm}$ upstream of the mechanical compressor (3) is determined by a map of the air cooler (6) as illustrated in FIG. 17 situated between the two compressors and by the air flow rate passing through the air cooler (6) and the external temperature. The map, for example, corresponds to a curve in the flow rate/external temperature plane. The air flow rate through the cooler $D_{air}$ corresponds to the air flow rate $D_{asp}$ aspirated by the cylinders. The engine instrumentation for this embodiment is depicted in FIG. 2a). This form of embodiment offers the advantage of not requiring any sensor upstream of the mechanical compressor.

According to a second alternative form of this step, the temperature $T_{avcm}$ upstream of the mechanical compressor (3) is determined by a temperature sensor positioned at the outlet of the air cooler (6) upstream of the mechanical compressor (3) before the bypass. The engine instrumentation for this embodiment is depicted in FIG. 2b).

Step 2) Acquiring Data

With reference to FIG. 15, the boost pressure $P_{sural}$ and boost temperature $T_{sural}$ on the intake side of the engine (1) are determined by sensors and the opening Bypass of the bypass valve (4) is determined by sensor 14. The sensed values $T_{avcm}, P_{sural}$ and $T_{sural}$ and the opening of the Bypass valve 14 value needs to be acquired in order to determine the pressure upstream $P_{avcm}$ of the mechanical compressor using the method according to the invention.

As depicted in FIGS. 2a) and 2b), the boost pressure $P_{sural}$ and boost temperature $T_{sural}$ on the intake side of the engine (1) can be determined by respective pressure and temperature sensors situated upstream of the engine at the outlet of the mechanical compressor (3) and of the bypass circuit.

The openness Bypass of the bypass valve (4) can be determined by its setpoint or by the position of its actuator.

It should be noted that step 2) is independent of step 1) and may be performed before, after or during step 1).

Step 3) Determining the Pressure Upstream of the Mechanical Compressor

With reference to FIG. 16, in order to determine the pressure $P_{avcm}$ of the gaseous mixture including fresh air and burnt gas upstream of the mechanical compressor (3), a dynamic model which is a C-law model based on a law of conservation of flow rate which applies to the volume upstream of the mechanical compressor (3), is made. The upstream volume $V_{avcm}$ upstream of the mechanical compressor (3) is limited by the mechanical compressor (3), the air cooler (6) and does not include the volume of the bypass circuit. The dynamic model C-law represents the filling of this volume and links the pressure $P_{avcm}$ upstream of the mechanical compressor (3) to the boost pressure $P_{sural}$ and boost temperature $T_{sural}$ on the intake side of the engine (1) and to the openness Bypass of the bypass valve (4). For preference, the dynamic model C-law may be written in the form of a formula of the type:

$$\dot{P}_{avcm} = \frac{RT_{avcm}}{V_{avcm}}(D_{bp} + D_c - D_{cm}),$$

the flow rates $D_{bp}$ and $D_{cm}$ are dependent on the pressure $P_{avcm}$ upstream of the mechanical compressor (3), on the boost pressure $P_{sural}$ and boost temperature $T_{sural}$ on the intake side of the engine (1) and on the openness of the bypass valve (4) sensed by sensor 14 in FIG. 15. The flow rate_$D_c$ may correspond to an estimate of the flow rate through the centrifugal compressor (2) using a filling model that models the filling of the cylinders plus a dynamic term originating from the deconvolution of the dynamics in the intake manifold. The aspirated flow rate $D_{asp}$ is given by the engine filling model which is a static model linking the flow rate aspirated by the cylinders to parameters on the intake side. This type of model is conventionally part of the engine control and may be of the type $D_{asp}$=function ($P_{sural}$, $T_{sural}$, Ne). This model is therefore a function of the boost pressure. Next, in order to determine the flow rate $D_c$, the dynamics in the intake manifold of the engine are determined in order to obtain a relationship of the type:

$$\dot{P}_{sural} = \frac{RT_{sural}}{V_{avcm}}(D_c - D_{asp}).$$

Advantageously, the flow rate $D_{bp}$ of FIG. 18 passing through the bypass valve (4) of FIG. 15 is determined by a pressure drop relationship (Barré-Saint-Venant equation) $D_{ph}$ across the bypass valve (4), which is written in the form of a formula of the type: $D_{bp}=A_{bp}(\text{Bypass})\times f(P_{avcm},P_{sural}, T_{avcm})$ where $A_{bp}(\text{Bypass})$ is the area of opening of the bypass valve and f is the flow rate per unit area as defined by a formula of the type:

$$f(P_{avcm}, P_{sural}, T_{avcm}) = \frac{P_{sural}}{\sqrt{RT_{avcm}}}$$

$$\begin{cases} \left(\frac{P_{avcm}}{P_{sural}}\right)^{\frac{1}{\gamma}}\sqrt{\frac{2}{\gamma-1}\left(1-\left(\frac{P_{avcm}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

In addition, the flow rate $D_{cm}$ passing through the mechanical compressor (3) can be determined when the mechanical compressor (3) is connected to the crankshaft of the engine (1) (compare FIGS. 1 and 2), by a formula of the type:

$$D_{cm} = \phi\left(r_{cm} \times N_e, \frac{P_{sural} + \delta P\left(r_{cm} \times N_e, \frac{P_{avcm}}{RT_{avcm}}\right)}{P_{avcm}}\right)\frac{P_{avcm}}{RT_{avcm}}.$$

In this formula, the term $r_{cm}\times Ne$ corresponds to the speed of the mechanical compressor (3) and the term $P_{sural}+\delta P$ corresponds to the value of the pressure downstream of the mechanical compressor $P_{apcm}$. What happens is that the volumetric flow rate ø of the mechanical compressor (3) is obtained from a map of the mechanical compressor (3) of the speed of the mechanical compressor as a function of the ratio of the downstream and upstream pressures. This map may form part of the data supplied by the supplier of the mechanical compressor (3) or may be determined experimentally. Furthermore, the term $$\frac{P_{avcm}}{RT_{avcm}}$$

represents the density $\rho_{cm}$ of the gases passing through the mechanical compressor.

Thus, the dynamic model can be written in the form of a formula of the form:

$$\dot{P}_{avcm} = \frac{RT_{avcm}}{V_{avcm}}\left(A_{bp}(\text{Bypass})\cdot f(P_{avcm}, P_{sural}, T_{avcm}) + D_c^{asp} - \phi\left(r_{cm}\times N_e, \frac{P_{sural} + \delta P\left(r_{cm}\cdot N_e, \frac{P_{avcm}}{RT_{avcm}}\right)}{P_{avcm}}\right)\frac{P_{avcm}}{RT_{avcm}}\right)$$

Once the model has been built, it is used to determine the pressure $P_{avcm}$ upstream of the mechanical compressor as a function of the acquired values of the boost pressure $P_{sural}$ and boost temperature $T_{sural}$ on the intake side of the engine (1), of the openness Bypass of the bypass valve (4) and of the flow rate $D_C$ passing through the compressor of the turbocharger (2). In this way, a value is obtained for the pressure $P_{avcm}$ without instrumenting with a pressure sensor upstream of the mechanical compressor (3).

The method according to the invention is suited to the combustion engine, notably for vehicles, and more particularly motor vehicles. The combustion engine concerned may be a gasoline engine or a diesel engine.

Applications of the Method According to the Invention

According to one embodiment of the invention, the method according to the invention may be used within a method for controlling the supercharging of a combustion engine. Thus, the invention also relates to a method for controlling the supercharging of a combustion engine (1) equipped with a supercharging system, the supercharging system comprising a turbocharger (2) and a mechanical compressor (3) for compressing the gaseous mixture including fresh air and burnt gas on the intake side of the engine (1) and a bypass circuit arranged in parallel with the mechanical compressor (3) comprising a bypass valve (4). For this method, the following steps are carried out:

a) the pressure $P_{avcm}$ of a gaseous mixture upstream of a mechanical compressor (3) is determined by the method as described hereinabove;

b) the pressure $P_{avcm}$ is used to determine supercharging conditions such as the quantities of air and of fuel within the cylinders of the engine (1), the engine speed and torque, etc.; and c) as a function of the supercharging conditions the bypass valve (4) and/or the turbocharger (2) (particularly when this is a variable geometry turbine (VGT) turbocharger) and/or if appropriate the clutch situated between the engine crankshaft and the mechanical compressor (3) is/are controlled.

According to one embodiment of the invention, the method as described hereinabove can be used within a method of diagnosing the supercharging. Thus, the invention further relates to a method for diagnosing abnormal operation of a combustion engine (1) equipped with a supercharging system, the supercharging system comprising a turbocharger (2) and a mechanical compressor (3) for compressing the gaseous mixture on the intake side of the engine (1) and a bypass circuit arranged in parallel with the mechanical compressor (3) comprising a bypass valve (4). For this method, the following steps are carried out:

a) the pressure $P_{avcm}$ of a gaseous mixture including fresh air and burnt gas upstream of a mechanical compressor (3) is determined by the method as described hereinabove;

b) the pressure $P_{avcm}$ is used to determine supercharging conditions such as the quantities of air and of fuel within the cylinders of the engine (1), the engine speed and torque, etc.; and c) abnormal operation of the supercharging system is detected as a function of the supercharging conditions.

For example, abnormal operation of the engine corresponds to a leak in the supercharging system.

According to one embodiment of the invention, the method for determining the pressure upstream of the mechanical compressor can be used within a method for controlling a combustion engine equipped with double supercharging. Thus, the invention also relates to a method of controlling a combustion engine (1) equipped with a supercharging system, the supercharging system comprising a turbocharger (2) and a mechanical compressor (3) for compressing a gaseous mixture on the intake side of the engine (1) and a bypass circuit arranged in parallel with the mechanical compressor comprising a controlled bypass valve (4). For this method, the following steps are carried out with reference to FIGS. 16 and 18:

a) a temperature $T_{avcm}$ upstream of the mechanical compressor (3), a boost pressure $P_{sural}$ and a boost temperature $T_{sural}$ on the intake side of the engine (1), and a pressure $P_{avcm}$ upstream of the mechanical compressor (3) are determined by the method as described previously;

b) a boost pressure setpoint $P_{sural}^{sp}$ is acquired;

c) a filling model that models the filling of the supercharging volume comprised between the intake valves of the engine (1) on the one hand, and the mechanical compressor (3) and the bypass valve (4) on the other is made, the model links the boost pressure $P_{sural}$ to the openness Bypass of the bypass valve by the pressure $P_{avcm}$ and the temperature $T_{avcm}$ upstream of the mechanical compressor (3) and the boost temperature $T_{sural}$;

d) an openness setpoint Bypass$^{sp}$ for the bypass valve (4) is determined by the filling model, of the boost pressure setpoint $P_{sural}^{sp}$, and of the pressure $P_{avcm}$ and the temperature $T_{avcm}$ upstream of the mechanical compressor (3) and of the boost pressure $P_{sural}$ and boost temperature $T_{sural}$; and e) the bypass valve (4) is controlled according to the openness setpoint Bypass$^{sp}$ of the bypass valve.

The filling model interprets the filling of the supercharging volume and takes the physical phenomena involved in this filling into consideration.

According to an alternative form of the invention, the evolution in pressure downstream of the mechanical compressor is governed by the dynamics of the filling of the volume situated upstream of the valves. These dynamics can be written in the form of a formula of the type:

$$\dot{P}_{sural} = \frac{RT_{sural}}{V_{sural}}(D_{cm} - D_{bp} - D_{asp})$$

The aspirated flow rate $D_{asp}$ is given by the engine filling model which is a static model linking the flow rate aspirated by the cylinders to parameters on the intake side. This type of model is conventionally part of the engine control and may be of the type $D_{asp}$=function ($P_{sural}$, $T_{sural}$, Ne). This model is therefore a function of the boost pressure.

The flow rates $D_{bp}$ and $D_{cm}$ may be determined in the same way as the way in which the pressure $P_{avcm}$ is determined.

In open loop, the filling model can be written in the form:

$$Bypass^{sp} = A_{bp}^{-1}\left(\frac{1}{f(P_{avcm}, P_{sural}, T_{avcm})}\left(-\frac{V_{sural}}{RT_{sural}}\dot{P}_{sural}^{sp} + \phi\left(r_{cm} \cdot N_e, \frac{P_{sural}^{sp} + \delta P(r_{cm} \cdot N_e \cdot \rho_{cm})}{P_{avcm}}\right)\rho_{cm} - D_{asp}^{sp}\right)\right).$$

Alternatively, the closed-loop filling model may be written in the form of a relationship of the type:

$$A_{bp}^{-1}\left(\frac{1}{f(P_{avcm}, P_{sural}^{sp}, T_{avcm})}\left(-\frac{V_{sural}}{RT_{sural}}\dot{P}_{sural}^{sp} + \delta_M + \phi\left(r_{cm} \cdot N_e, \frac{P_{sural}^{sp} + \delta P(r_{cm} \cdot N_e \cdot \rho_{cm})}{P_{avcm}}\right)\rho_{cm} - D_{asp}^{sp}\right)\right)$$

with $\delta_{P1} = K_p(P_{sural} - P_{sural}^{sp}) - K_i \int_0^t (P_{sural} - P_{sural}^{sp})dt$, $K_p, K_i$ being feedback loop calibration parameters.

Examples of Applications

Figure 11A:
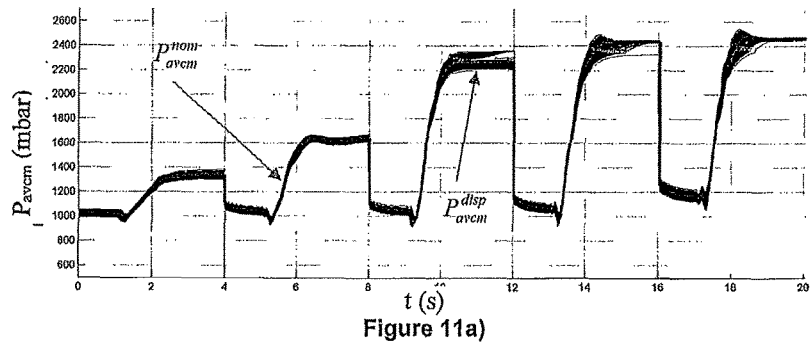
FIGS. 11a) and 11b) represent the pressure upstream of the mechanical compressor for a closed-loop control according to an engine control method respectively using a measurement of the pressure upstream of the mechanical compressor and implementing the determination method according to the invention for various engine speeds: 1000, 1500, 2000, 2500 and 3000 rpm.
Figure 11B:
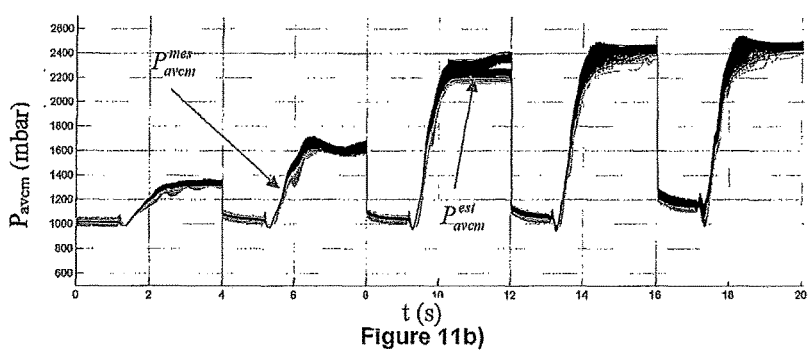
Figure 12A:
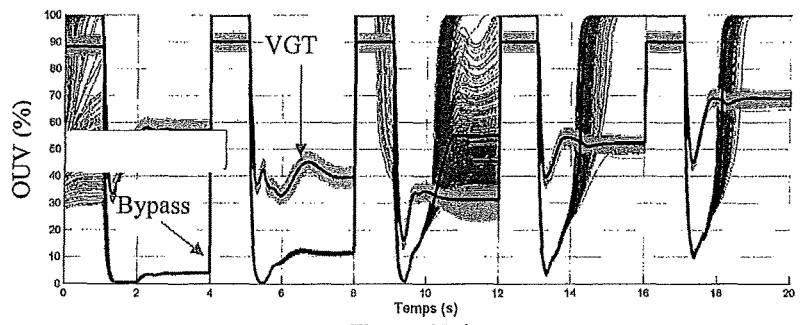
FIGS. 12a) and 12b) represent the positions of the actuators for a closed-loop control according to an engine control method respectively using a measurement of the pressure upstream of the mechanical compressor and implementing the determination method according to the invention for various engine speeds: 1000, 1500, 2000, 2500 and 3000 rpm.
Figure 12B:
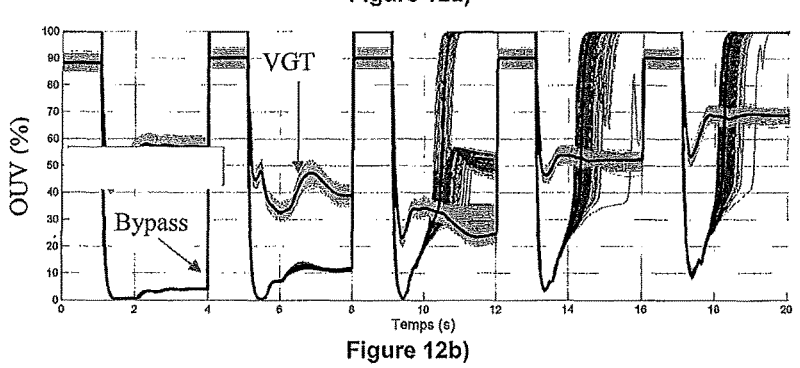

In order to verify the estimate of the pressure $P_{avcm}$ with the method of the invention, simulations are carried out for the instrumentation according to the prior art (FIG. 1) and according to the diagram of FIG. 2a), with a mechanical compressor. The control method according to the third embodiment of the invention for the open-loop control and closed-loop control of the instrumented combustion engine is also simulated. For these simulations, the predetermined threshold S for use of the mechanical compressor (3) is set at 3000 rpm. FIGS. 6 to 9, 13a) and 14a) correspond to open-loop control as described hereinabove, and FIGS. 10 to 12 correspond to closed-loop control as described in the paragraph above.

Figure 3A:
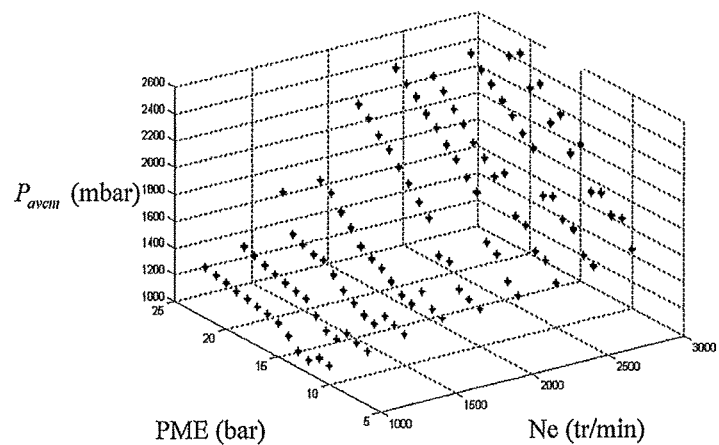
FIG. 3a) illustrates the difference between pressures estimated by the method according to the invention and reference pressures and FIG. 3b) represents the absolute errors in pressure in a speed-torque plane.
Figure 3B:
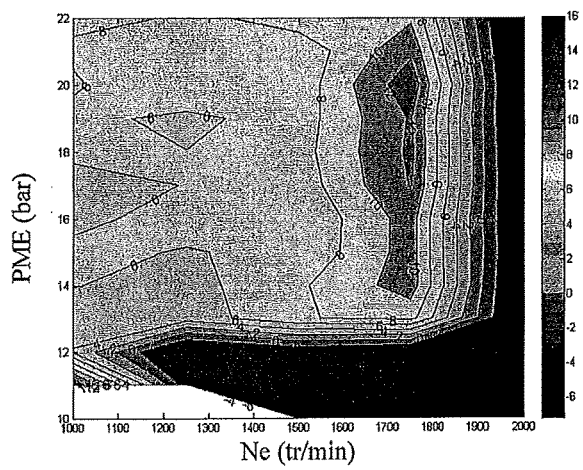

FIGS. 3a) and 3b) show the results of estimates of the pressure upstream of the mechanical compressor (3) for all the operating points of the zone of use of the mechanical compressor (3). FIG. 3a) represents the points of actual values given by a reference model and points of values given by the method according to the invention. It may be noted that the points of the reference model and the estimated points are superposed. The estimate is therefore good over the entire operating range. FIG. 3b) shows the absolute errors in pressure in a mean effective pressure MEP and engine speed Ne frame of reference. It may be noted that the discrepancies are minimal (comprised between −6 and 16 mbar).

In order to study the robustness of the determination method in the presence of spread, spread is considered for the various sensors and the various components of the supercharging system. The spread is intended to simulate a difference between vehicles as they leave the factory. A test sample of one thousand vehicles is considered. The spread follows a Gaussian distribution. The spread is as follows:

boost pressure sensor: three sigma at 35 mbar (which means that the probability of the actual pressure value being less than 35 mbar away from the measured value is 99.7%), boost temperature sensor: three sigma at 3° C., atmospheric pressure sensor: three sigma at 35 mbar (same spread as the boost pressure sensor), flow rate through the mechanical compressor: three sigma at 0.5%, and position of the bypass valve: three sigma function of openness, cf. Table 1 below.

TABLE 1

| Spread on bypass valve | | | | | | |
|---|---|---|---|---|---|---|
| Bypass valve openness (%) | 100 | 80 | 60 | 40 | 20 | 0 |
| Three sigma (%) | 1.46 | 2.91 | 4.01 | 5.48 | 7.80 | 6.63 |

Figure 4A:
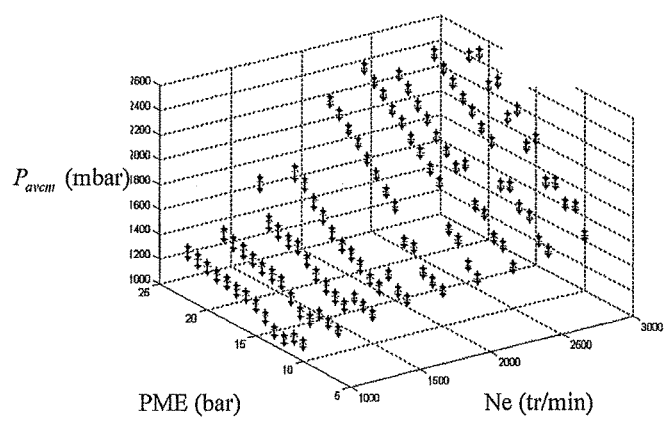
FIGS. 4a) and 4b) respectively correspond to FIGS. 3a) and 3b) taking spread on the sensors and on the components of the supercharging system into consideration.
Figure 4B:
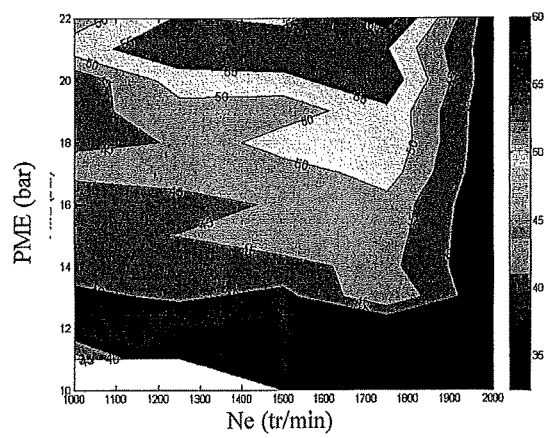

FIGS. 4a) and 4b) correspond to FIGS. 3a) and 3b) and show the results on all the operating points of the zone of use of the mechanical compressor over five thousand dispersed tests. In FIG. 4a) the pale gray points in the middle are the actual values given by the reference model and the black points are the values at plus and minus three sigma. It will be noted that the variation in the estimate is small: the black points closely flank the reference points. FIG. 4b) shows the errors at three sigma for pressure. These results show that the estimate is not very dependent on the reliability of the inputs. The error remains below 60 mbar. As a result, the control method according to the invention is very robust as far as spread is concerned.

Figure 5:
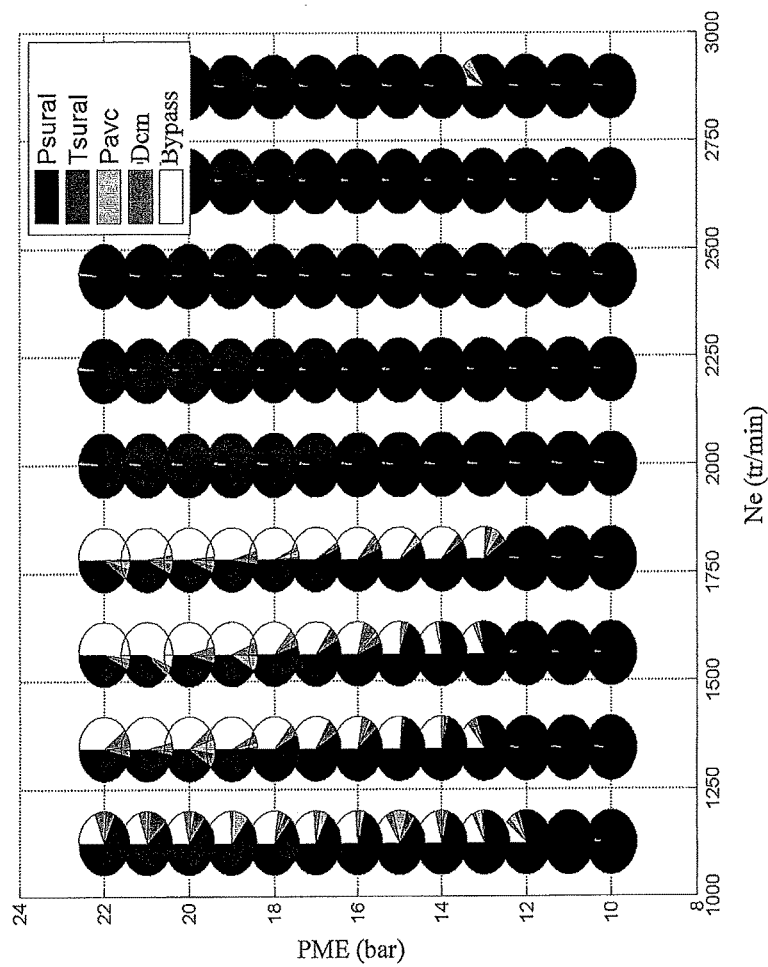
FIG. 5 illustrates the origin of the spread in the estimate of pressure upstream of the mechanical compressor.

FIG. 5 shows, on each operating point, the origin of the spread in the estimate of the pressure upstream of the mechanical compressor. Each pie represents the contribution that the spread on each input: boost pressure Psural, boost temperature Tsural, pressure upstream of the mechanical compressor Pavc, mechanical compressor flow rate Dcm and openness of the bypass valve Bypass makes to the output spread. It may be noted that the boost pressure is the most influential, notably at the heaviest loads where the Barré Saint Venant function is in a zone of great variation (the pressure difference across the terminals of the bypass valve is small at these points). At the lightest loads, it may be noted that the bypass valve section adopts greater influence. This is because this valve is partially closed in this zone in order to achieve the required boost pressure. An error in the positioning of the valve may therefore greatly alter the estimate of the pressure upstream of the mechanical compressor.

In order to evaluate the impact that estimating using the method according to the invention has on the control method of the third embodiment, attention is first of all paid to an open-loop control in order to verify that the estimate made returns results equivalent to the prior art. A case without spread is considered first of all, then the case where there is spread on the system. Afterwards, the closed-loop strategy is assessed for the case with spread.

Figure 6A:
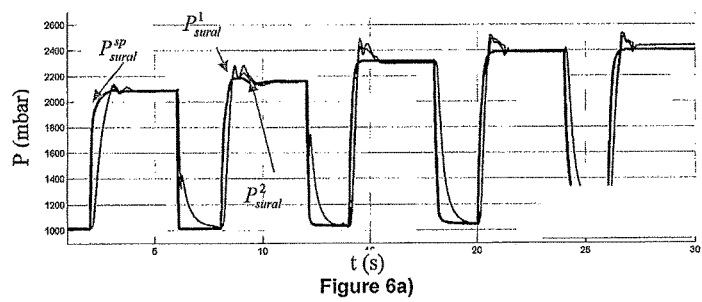
FIGS. 6a) to 6d) represent the boost pressure, the pressure upstream of the compressor, the openness of the bypass valve and of the VGT turbine and the mean effective pressure (MEP) for open-loop control according to an engine control method implementing the determination method according to the invention for various engine speeds: 1000, 1500, 2000, 2500 and 3000 rpm.
Figure 6B:
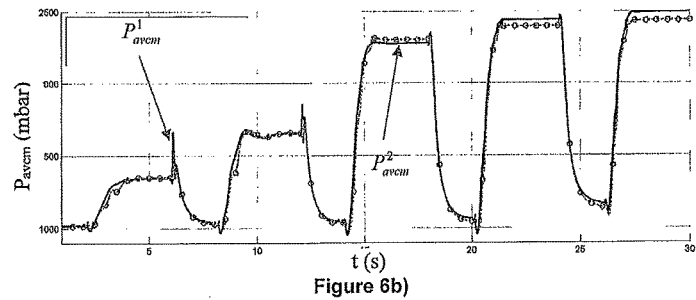
Figure 6C:
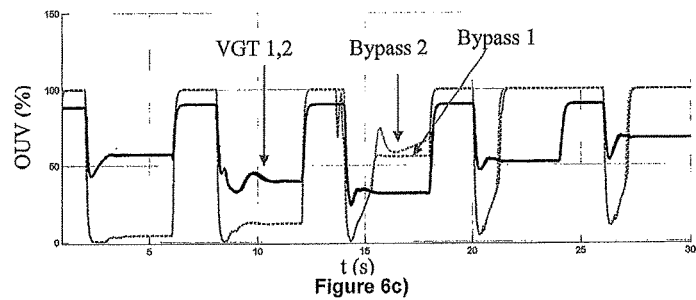
Figure 6D:
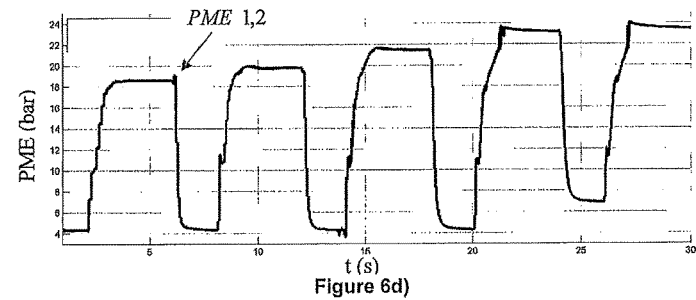

FIGS. 6a) to 6c) show successive increases in load for speeds of 1000, 1500, 2000, 2500, 3000 rpm for the open-loop control method. In these figures, the index 1 corresponds to the determination method according to the invention (without sensor, FIG. 2a) and the index 2 corresponds to the method with pressure and temperature sensors upstream of the mechanical compressor (FIG. 1). FIG. 6a) shows the setpoint boost pressure $P_{sural}^{sp}$ and the boost pressures determined according to the prior art and according to the invention. It may be noted that the method of determining the pressure upstream has no influence on the speed of the control method. FIG. 6b) illustrates the comparison between the pressure upstream of the mechanical compressor obtained by the two methods. It may be noted that the plots for the two methods are similar. FIG. 6c) shows the opennesses of the bypass valve (4) and of the variable geometry turbocharger (2). In all the figures, the opennesses are expressed in percent, 0% signifies that the actuator is closed, whereas 100% signifies that the actuator is wide open. It may be noted that the position defined by the control method is almost the same for both methods. However, there is a perceptible difference in the position of the bypass valve at the end of the transient at 2000 rpm. This is not detrimental because the difference in pressure across the bypass valve is very small at this point. FIG. 6d) shows that the plot of the mean effective pressure MEP is the same for both methods.

In order to verify the robustness of the open-loop control method using the determination method according to the invention, simulations are carried out in which spread on the various sensors and components of the supercharging system is considered. The purpose of the spread is to simulate a difference between vehicles as they leave the factory. A sample size of one thousand vehicles is considered. The spread follows a Gaussian distribution.

The spread on the sensors is as follows:
boost pressure sensor (instrumentation according to the prior art): three sigma at 35 mbar (which means that the probability of the actual pressure value being less than 35 mbar away from the measured value is 99.7%), pressure sensor sensing pressure upstream of mechanical compressor: three sigma at 35 mbar (it should be noted that the two pressure sensors may be readjusted to one another, and the spread applied thereafter is therefore identical for both these sensors), boost temperature sensor: three sigma at 3° C., temperature sensor sensing temperature upstream of mechanical compressor (3) (instrumentation according to the prior art): three sigma at 3° C.

The spread on the components of the supercharging system is as follows:
flow rate through the mechanical compressor (3): three sigma at 0.5%, effectiveness of the centrifugal compressor (2): three sigma at 2%, effectiveness of the turbine (2): three sigma at 2%, position of the VGT (2): three sigma at 4%, position of the bypass valve (3): three sigma dependent on openness, cf. Table 1 below:

TABLE 1

| Spread on bypass valve | | | | | | |
|---|---|---|---|---|---|---|
| Openness of bypass valve (%) | 100 | 80 | 60 | 40 | 20 | 0 |
| Three sigma (%) | 1.46 | 2.91 | 4.01 | 5.48 | 7.80 | 6.63 |

Figure 7A:
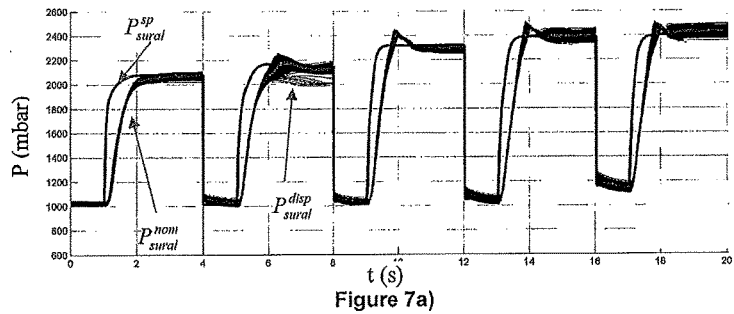
FIGS. 7a) and 7b) represent the boost pressure for an open-loop control according to an engine control method respectively using a measurement of the pressure upstream of the mechanical compressor and implementing the determination method according to the invention for various engine speeds: 1000, 1500, 2000, 2500 and 3000 rpm.
Figure 7B:
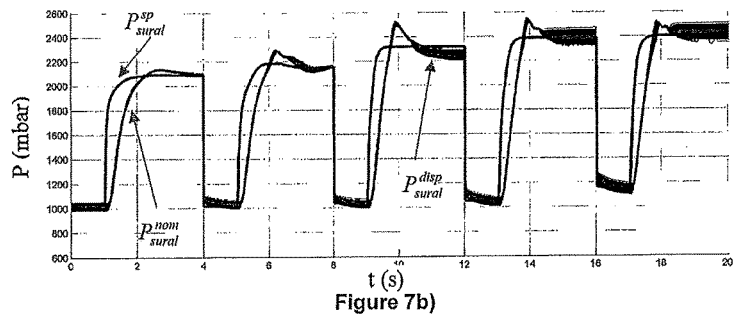

FIGS. 7a) to 9b) show the same load transients at their various speeds as in FIGS. 6a) to 6c). FIGS. 7a), 8a) and 9a) correspond to the embodiment according to the prior art (FIG. 1 with four sensors), FIGS. 7b), 8b) and 9b) correspond to the embodiment according to the invention (FIG. 2a) with no sensor upstream of the mechanical compressor).

FIGS. 7a) and 7b) provide the plot of boost pressure for the two methods. In these figures, the setpoint ("sp"), the response without spread ("nom") and the thousand cases with spread ("disp") are shown in a finer line. For the method according to the prior art, the spread on the boost pressure is great. For the method according to the invention it may be noted that the spread is not so great at low engine speeds for which the mechanical compressor is called into operation. This is because the fact of estimating the pressure upstream of the mechanical compressor allows this information to be made consistent with the boost pressure measurement (which is not the case when the measurement incorporating spread is used).

Figure 8A:
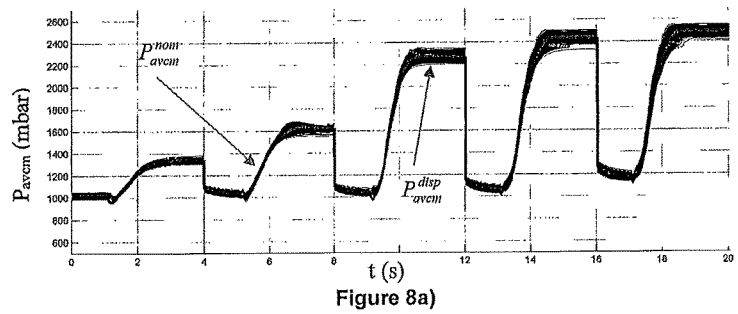
FIGS. 8a) and 8b) represent the pressure upstream of the mechanical compressor for an open-loop control according to a method of controlling the engine respectively using a measurement of the pressure upstream of the mechanical compressor and implementing the determination method according to the invention for various engine speeds: 1000, 1500, 2000, 2500 and 3000 rpm.
Figure 8B:
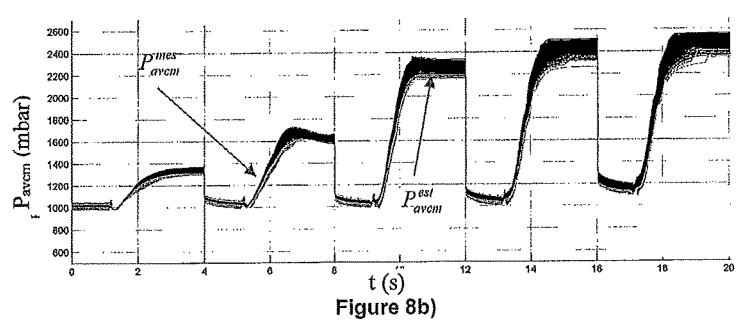

FIGS. 8a) and 8b) show the pressure upstream of the mechanical compressor on the same tests. The curves in thicker line correspond to the nominal value ("nom") whereas the curves in finer line correspond to the thousand cases with spread ("disp"). It may be noted that the values determined according to the method according to the invention have slightly less spread than in the prior art. This confirms the observations made previously.

Figure 9A:
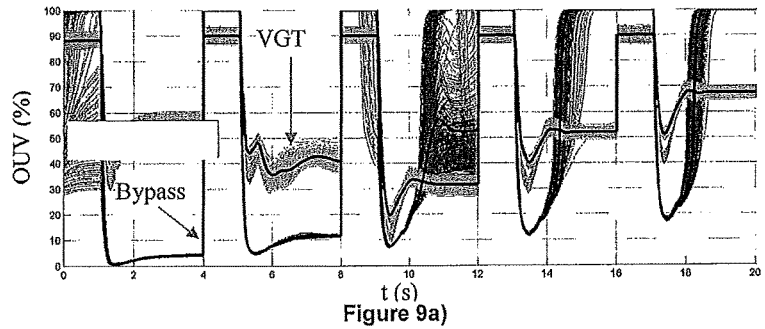
FIGS. 9a) and 9b) represent the positions of the actuators for an open-loop control according to an engine control method respectively using a measurement of the pressure upstream of the mechanical compressor and implementing the determination method according to the invention for various engine speeds: 1000, 1500, 2000, 2500 and 3000 rpm.
Figure 9B:
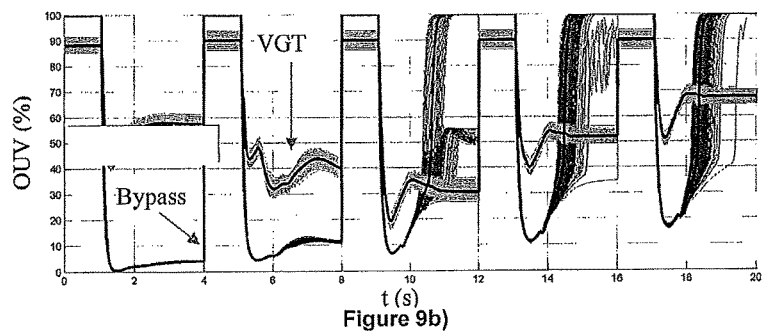

FIGS. 9a) and 9b) show the position of the actuators in the same tests. Once again, the spread obtained is of the same order as for the boost pressure and pressure upstream of mechanical compressor.

Therefore the open-loop control method using the determination method according to the invention is robust with respect to spread and is even slightly more robust than the same control method using pressure measurements.

In order to verify the robustness with respect to spread for the closed-loop control method using the determination method according to the invention, simulations are carried out for which the same spread is considered for the various sensors and components of the supercharging system.

Figure 10A:
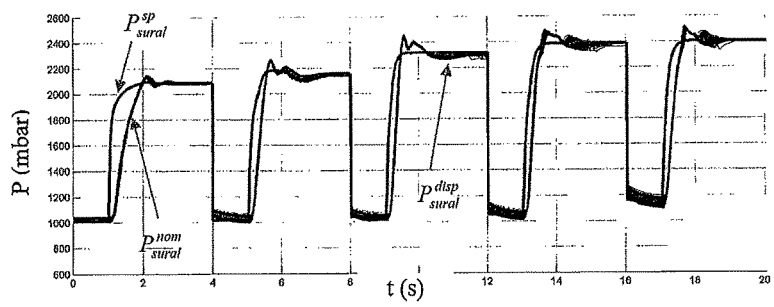
FIGS. 10a) and 10b) represent the boost pressure for a closed-loop control according to an engine control method respectively using a measurement of the pressure upstream of the mechanical compressor and implementing the determination method according to the invention for various engine speeds: 1000, 1500, 2000, 2500 and 3000 rpm.
Figure 10B:
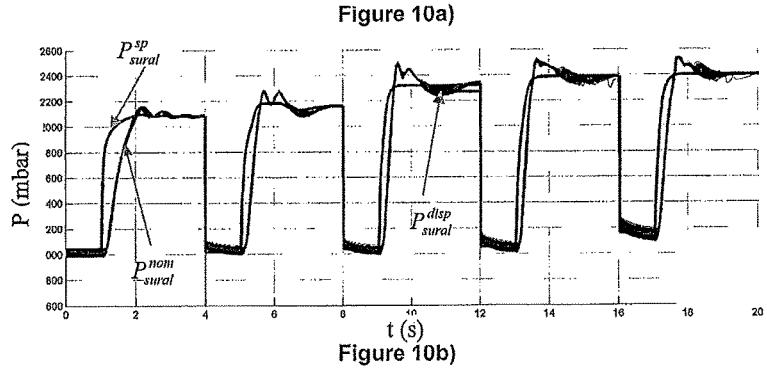

FIGS. 10a) to 12b) correspond to FIGS. 7a) to 9b) for which the control method is a closed-loop control.

FIGS. 7a) and 7b) show the plot of boost pressure. The two methods (with and without sensor) yield similar results in terms of following the plot.

FIGS. 8a) and 8b) as well as FIGS. 9a) and 9b) show the pressure upstream of the mechanical compressor and the position of the actuators. Once again it may be seen that the results for the two methods are similar.

Therefore the use of the method for determining the pressure upstream of the mechanical compressor makes it possible to achieve a control method which is robust with respect to spread.

Figure 13A:
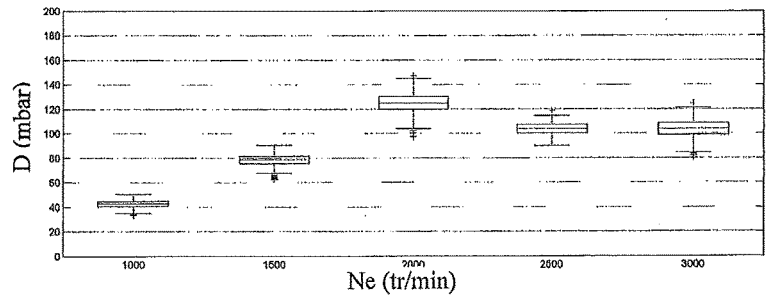
FIGS. 13a) and 13b) illustrate the boost pressure overshoot for one thousand dispersed tests for closed loop control according to an engine control method respectively using a measurement of the pressure upstream of the mechanical compressor and implementing the determination method according to the invention for various engine speeds: 1000, 1500, 2000, 2500 and 3000 rpm.
Figure 13B:
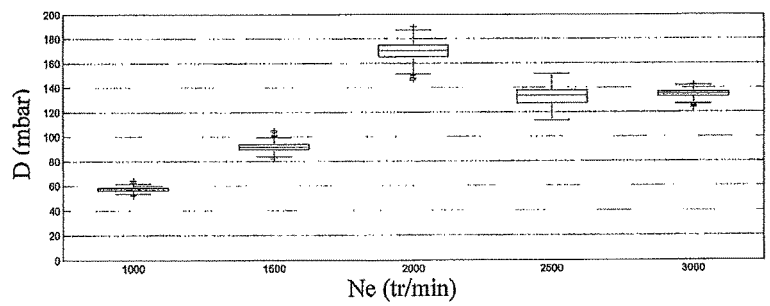
Figure 14A:
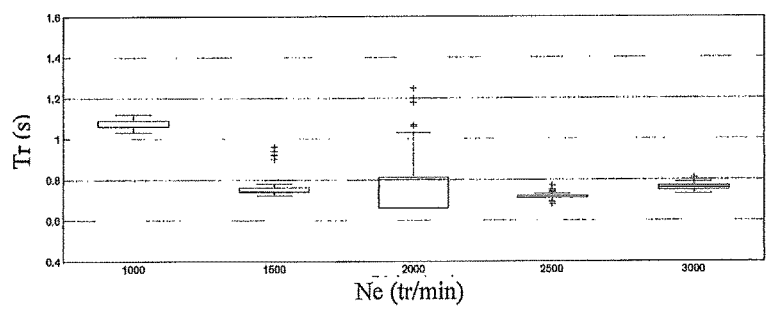
FIGS. 14a) and 14b) illustrate the boost pressure response time over one thousand dispersed tests for closed-loop control according to an engine control method respectively using a measurement of the pressure upstream of the mechanical compressor and implementing the determination method according to the invention for various engine speeds: 1000, 1500, 2000, 2500 and 3000 rpm.
Figure 14B:
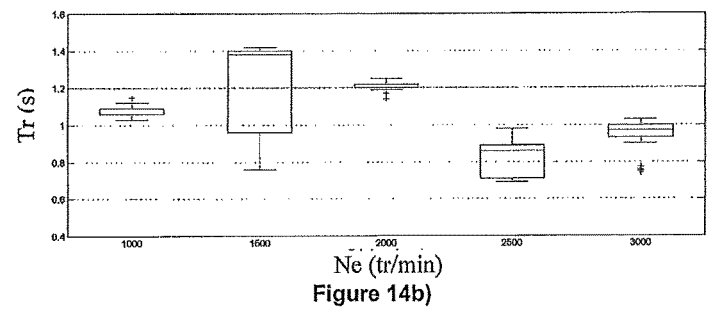

FIGS. 13a) to 14b) give the overshoot D and the response time Tr at 95% of the boost pressure over the thousand tests with spread. FIGS. 13a) and 14a) correspond to the closed-loop control using the determination method according to the prior art. FIGS. 13b) and 14b) correspond to the closed-loop control using the determination method according to the invention. For each engine speed, the horizontal lines of the rectangles define the second quartile, the median and the third quartile. The lines outside the rectangle represent the three-sigma interval (99.7% of the points are inside the interval). The points defined by crosses are marginal points. The overshoot values D and response times Tr are slightly less good for the method according to the invention but are still acceptable. This can be explained by estimation discrepancies in transient mode.

It may be noted that the estimate of pressure upstream of the mechanical compressor is satisfactory throughout the operating range, even when there is spread on the sensors and components of the supercharging system.

An analysis of the transient results supports the conclusion that the same performance is obtained by both methods (with and without sensor upstream of the mechanical compressor).

The invention claimed is:

1. A method of determining a pressure of a gaseous mixture including fresh air and burnt gas at an intake side of an internal combustion engine upstream of a mechanical compressor, at least one sensor, and a bypass circuit disposed in parallel with the mechanical compressor within a supercharging system of the internal combustion engine which includes a variable geometry turbocharger for compressing the gaseous mixture at the intake side of the engine, comprising:
    a) determining a temperature of the gaseous mixture upstream of the mechanical compressor;
    b) acquiring a boost pressure and a boost temperature on the intake side of the engine and a degree of opening of the bypass valve by a control unit positioned upstream of an intake manifold of the engine by the at least one sensor;
    c) determining the pressure upstream of the mechanical compressor from a dynamic model programmed in a processor which executes programming expressing a conservation-of-flow law involving the gaseous mixture upstream of the mechanical compressor by determining pressure of the gaseous mixture upstream from the mechanical compressor from a temperature of the gaseous mixture upstream from the mechanical compressor and a boost pressure and a boost temperature of the gaseous mixture downstream from the mechanical compressor and a degree of opening of the bypass valve; and
    d) controlling with an actuator at least the variable geometry of the turbocharger and the degree of opening of the bypass valve based upon the determined pressure of the gaseous mixture upstream of the mechanical compressor.

2. The method according to claim 1, wherein the supercharging system comprises an air cooler for cooling a charge which is disposed between the turbocharger and the mechanical compressor and further comprising determining a temperature of the gaseous mixture upstream of the mechanical compressor by using a map of a flow rate passing through the air cooler.

3. The method according to claim 2 wherein the dynamic model is programmed in a processor which executes programming expressing a formula:

$$\dot{P}_{avcm} = \frac{RT_{avcm}}{V_{avcm}}(D_{bp} + D_c - D_{cm})$$

wherein $\dot{P}_{avcm}$ is a first derivative with respect to time of pressure $P_{avcm}$ upstream of the mechanical compressor, R is a perfect gas constant, $V_{avcm}$ is a volume upstream of the mechanical compressor, $D_{bp}$ is a flow rate passing through the bypass valve, $D_c$ is a flow rate passing through the turbocharger and $D_{cm}$ is a flow rate passing through the mechanical compressor and wherein the flows $D_{bp}$ and $D_{cm}$ are dependent on the pressure $P_{avcm}$ upstream of the mechanical compressor, on the pressure $P_{sural}$ and on a boost temperature $T_{sural}$ on the intake side of the engine and on a degree of opening of the bypass valve.

4. The method according to claim 3 wherein:
    determining a flow rate $D_{bp}$ passing through the bypass valve from a pressure drop relationship across the bypass valve programmed in a processor which executes programming, expressing a relationship: $D_{bp}=A_{bp}(\text{Bypass})\times f(P_{avcm},P_{sural},T_{avcm})$ where $A_{bp}(\text{Bypass})$ is an area of opening of the bypass valve and f is a flow rate per unit area defined by a formula:

$$f(P_{avcm}, P_{sural}, T_{avcm}) = \frac{P_{sural}}{\sqrt{RT_{avcm}}}$$

-continued $$\begin{cases} \left(\frac{P_{avcm}}{P_{sural}}\right)^{\frac{1}{\gamma}}\sqrt{\frac{2}{\gamma-1}\left(1-\left(\frac{P_{avcm}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

where $\gamma$ is a ratio of mass heat capacities of the gases.

5. The method according to claim 4, wherein the mechanical compressor is driven by a crankshaft of the engine and a flow rate $D_{cm}$ which passes through the mechanical compressor is programmed in a processor which executes programming expressing a formula:

$$D_{cm} = \phi\left(r_{cm} \times N_e, \frac{P_{sural} + \delta P\left(r_{cm} \times N_e, \frac{P_{avcm}}{RT_{avcm}}\right)}{P_{avcm}}\right)\rho_{cm}$$

where $r_{cm}$ is a reduction ratio between the mechanical compressor and the crankshaft, $\rho_{cm}$ is a density of the gases passing through the mechanical compressor expressed by $$\rho_{cm} = \frac{P_{acvm}}{RT_{acvm}},$$

R is the perfect gas constant, ø is a volumetric flow rate of the mechanical compressor and $\delta P$ is a pressure drop across an air cooler located between the turbocharger and the mechanical compressor.

6. The method according to claim 2, wherein the mechanical compressor is driven by an electrical motor.

7. The method according to claim 1 wherein the dynamic model is programmed in a processor which executes programming expressing a formula:

$$\dot{P}_{avcm} = \frac{RT_{avcm}}{V_{avcm}}(D_{bp} + D_c - D_{cm})$$

wherein $\dot{P}_{avcm}$ is a first derivative with respect to time of pressure $P_{avcm}$ upstream of the mechanical compressor, R is a perfect gas constant, $V_{avcm}$ is a volume upstream of the mechanical compressor, $D_{bp}$ is a flow rate passing through the bypass valve, $D_c$ is a flow rate passing through the turbocharger and $D_{cm}$ is a flow rate passing through the mechanical compressor and wherein the flows $D_{bp}$ and $D_{cm}$ are dependent on the pressure $P_{avcm}$ upstream of the mechanical compressor, on the pressure $P_{sural}$ and on a boost temperature $T_{sural}$ on the intake side of the engine and on a degree of opening of the bypass valve.

8. The method according to claim 7, comprising:
determining a flow rate $D_{bp}$ passing through the bypass valve from a pressure drop relationship across the bypass valve programmed in a processor which executes programming, expressing a relationship: $D_{bp}=A_{bp}(Bypass)\times f(P_{avcm},P_{sural},T_{avcm})$ where $A_{bp}(Bypass)$ is an area of opening of the bypass valve and f is a flow rate per unit area defined by a formula:

$$f(P_{avcm}, P_{sural}, T_{avcm}) = \frac{P_{sural}}{\sqrt{RT_{avcm}}}$$

$$\begin{cases} \left(\frac{P_{avcm}}{P_{sural}}\right)^{\frac{1}{\gamma}}\sqrt{\frac{2}{\gamma-1}\left(1-\left(\frac{P_{avcm}}{P_{sural}}\right)^{\frac{\gamma-1}{\gamma}}\right)} & \text{if } \left(\frac{P_{avcm}}{P_{sural}}\right) > \left(\frac{2}{\gamma+1}\right)^{\frac{\gamma}{\gamma+1}} \\ \left(\frac{2}{\gamma+1}\right)^{\frac{\gamma+1}{\gamma-1}} & \text{if } \left(\frac{P_{avcm}}{P_{sural}}\right) \leq \left(\frac{2}{\gamma+1}\right)^{\frac{\gamma}{\gamma+1}} \end{cases}$$

where $\gamma$ is a ratio of mass heat capacities of the gases.

9. The method according to claim 8, wherein the mechanical compressor is driven by an electrical motor.

10. The method according to claim 7, wherein the mechanical compressor is driven by a crankshaft of the internal combustion engine and a flow rate $D_{cm}$ which passes through the mechanical compressor is programmed in a processor which executes programming expressing a formula:

$$D_{cm} = \phi\left(r_{cm} \times N_e, \frac{P_{sural} + \delta P\left(r_{cm} \times N_e, \frac{P_{avcm}}{RT_{avcm}}\right)}{P_{avcm}}\right)\rho_{cm}$$

where $r_{cm}$ is a reduction ratio between the mechanical compressor and the crankshaft, $\rho_{cm}$ is a density of the gases passing through the mechanical compressor expressed by $$\rho_{cm} = \frac{P_{acvm}}{RT_{acvm}},$$

R is the perfect gas constant, ø is a volumetric flow rate of the mechanical compressor and $\delta P$ is a pressure drop across an air cooler located between the turbocharger and the mechanical compressor.

11. The method according to claim 7, wherein the mechanical compressor is driven by an electrical motor.

12. The method according to claim 1, wherein the mechanical compressor is driven by an electrical motor.

13. The method according to claim 1, wherein the determined pressure, identified as $P_{avcm}$, is saturated by atmospheric pressure $P_{atm}$ and the boost pressure, which is expressed as $P_{sural}$, is P represented by a formula: $P_{avcm}=\min(\max(P_{atm},P_{avcm}), P_{sural})$.

14. The method according to claim 1, wherein the boost pressure and the boost temperature on the intake side of the engine are acquired by the at least one sensor including a pressure sensor and a temperature sensor positioned upstream of an intake manifold of the internal combustion engine.

15. A method for diagnosing an abnormal operation of a supercharging system of a combustion engine, including a turbocharger, a mechanical compressor, at least one sensor, and a bypass circuit including a bypass valve disposed in parallel with the mechanical compressor for compressing a gaseous mixture including fresh air and burnt gas on an intake side of the engine, comprising:
a) determining a pressure of the gaseous mixture upstream of the mechanical compressor from a dynamic model programmed in a processor which executes programming expressing a conservation-of-flow rate law applied to a volume of the gaseous mixture upstream of the mechanical compressor, the dynamic model linking pressure upstream of the mechanical compressor to a temperature upstream of the mechanical compressor, and a boost pressure and a boost temperature at the intake side of the internal combustion engine, and to an degree of opening of the bypass valve by the at least one sensor;

b) determining supercharging conditions by using the determined pressure of the gaseous mixture; and c) detecting the abnormal operation of the supercharging system from the supercharging conditions.

16. The method according to claim 15, wherein:

the abnormal operation of the supercharging system is a pressure leak in the intake system.

\* \* \* \* \*